(12) United States Patent
Inoue

(10) Patent No.: US 6,837,143 B2
(45) Date of Patent: Jan. 4, 2005

(54) CYLINDER DEVICE

(75) Inventor: Koichi Inoue, Kanagawa (JP)

(73) Assignee: Unisia JKC Steering Systems Co., Ltd., Atsugi (JP)

( * ) Notice: Subject to any disclaimer, the term of this patent is extended or adjusted under 35 U.S.C. 154(b) by 25 days.

(21) Appl. No.: 10/441,288

(22) Filed: May 20, 2003

(65) Prior Publication Data

US 2004/0025687 A1 Feb. 12, 2004

(30) Foreign Application Priority Data

May 20, 2002 (JP) ........................................ 2002-144781

(51) Int. Cl.$^7$ ............................ F16D 15/08; B62D 3/12
(52) U.S. Cl. ...................................... 92/85 R; 180/444
(58) Field of Search .......................... 92/85 R, 165 R; 180/400, 444

(56) References Cited

U.S. PATENT DOCUMENTS

| | | | | |
|---|---|---|---|---|
| 4,127,186 A | * | 11/1978 | Koyano et al. | ............. 180/428 |
| 5,330,023 A | * | 7/1994 | Miyashita et al. | .......... 180/400 |
| 5,788,009 A | * | 8/1998 | Lee | ............................. 180/428 |
| 6,089,589 A | * | 7/2000 | Miyazaki | ................... 74/89.11 |

FOREIGN PATENT DOCUMENTS

JP           62-3368 U          1/1987

* cited by examiner

Primary Examiner—Thomas E. Lazo
(74) Attorney, Agent, or Firm—Foley & Lardner LLP

(57) ABSTRACT

A cylinder device such as a power cylinder of a power steering system includes a slidable shaft slidably disposed inside a housing. A joint member is connected to the end section of the slidable shaft. A stopper member is disposed between the slidable shaft and the joint member. Here, the end section of the slidable shaft is cutout to form an axial engagement surface. The slidable shaft and the joint member are connected in a condition where the end face of the slidable shaft is in contact with the end face of the joint member so as to from a groove between the axial engagement surface and the joint member. The stopper member is formed annular and has an engagement section formed along its inner periphery. The engagement section is fitted in the groove so that the stopper member is prevented from at least an axial movement.

12 Claims, 6 Drawing Sheets

CYLINDER DEVICE

BACKGROUND OF THE INVENTION

This invention relates to improvements in a cylinder device of the type including a stopper section for stopping a relative sliding movement between a housing and a shaft (rack bar) extending through and slidably movable in the housing at a position where the sliding movement terminates, for example, a power cylinder of a power steering system, and more particularly to the improvements in technique of the stopper section.

Hitherto a variety of such cylinder devices have been proposed and put into practical use. One of them is disclosed in Japanese Utility Model Publication No. 62-3368 relating to a rack-and-pinion steering gear. In this rack-and-pinion steering gear, a socket for a tie rod is connected to an end section of a rack bar (slidable shaft) under being screwed in, in which a stopper member is incorporated to buffer contact between the socket and the end section of a housing. The stopper member is constituted of a metal ring having an opening to be mounted on the threaded section of the socket, and an annular elastomeric member fixed to the metal ring at an outer peripheral side facing the rack bar. This stopper member is incorporated and fixed in a state where the inner peripheral section of the metal ring is put between the end face of the rack bar and the end face of the socket at a screw-in joint. The metal ring is provided with projections which are to be engaged with radial cutouts formed at the end face of the rack bar so that the metal ring is prevented from its rotation.

However, in the above conventional cylinder device, the stopper member is incorporated and fixed in the state where the inner peripheral section of the metal ring is put between the end face of the rack bar and the end face of the socket at the screw-in joint as discussed above, and therefore the length of the cylinder device is unavoidably increased by an amount corresponding to the thickness of the metal ring. This enlarges the size of the cylinder device while providing considerable restriction in designing the cylinder device.

SUMMARY OF THE INVENTION

It is, therefore, an object of the present invention to provide an improved cylinder device which can effectively overcome drawbacks encountered in conventional cylinder devices such as a power cylinder of a power steering system.

Another object of the present invention is to provide an improved cylinder device which can be prevented from being large-sized without receiving restriction relating to its axial length in design.

A further object of the present invention is to provide an improved cylinder device including a stopper member having a buffering function, which can be installed without changing the axial length of the cylinder device.

An aspect of the present invention resides in a cylinder device comprising a housing. A slidable shaft is slidably movably disposed inside the housing and projectable out of the housing. A joint member is connected to the end section of the slidable shaft. A stopper member is disposed at a joint section between the slidable shaft and the joint member so as to be brought into contact with an end section of the housing to stop a relative slidable movement between the slidable shaft and the housing and to provide a buffering function during contact of the slidable shaft to the housing. In the above cylinder device, the end section of the slidable shaft is partially cutout to form an axial engagement surface exposed at an tip end of the slidable shaft including an end face whose surface area is smaller than a cross-sectional area of the end section. The slidable shaft and the joint member are connected to each other in a condition where the end face of the slidable shaft is in contact with an end face of the joint member so that a groove is formed between the axial engagement surface of the slidable shaft and the end face of the joint member. Additionally, the stopper member is formed annular to have an opening so as to be mountable on an outer peripheral surface of the slidable shaft and has an engagement section formed along an inner periphery of the stopper member, the engagement section of the stopper member being fitted in the groove so that the stopper member is prevented from at least an axial movement.

Another aspect of the present invention resides in a method of assembling a cylinder device including a housing, a slidable shaft which is slidably movably disposed inside the housing and projectable out of the housing, a joint member connected to the end section of the slidable shaft, and a stopper member disposed at a joint section between the slidable shaft and the joint member so as to be brought into contact with an end section of the housing to stop a relative slidable movement between the slidable shaft and the housing and to provide a buffering function during contact of the slidable shaft to the housing. The assembling method comprises the following steps of: (a) providing the slidable shaft whose end section is partially cutout to form an axial engagement surface exposed at an tip end of the slidable shaft including an end face whose surface area is smaller than a cross-sectional area of the end section; (b) providing the stopper member formed annular to have an opening so as to be mountable on an outer peripheral surface of the slidable shaft and having an engagement section formed along an inner periphery of the stopper member; and (c) connecting the slidable shaft and the joint member to each other in a condition where the end face of the slidable shaft is in contact with an end face of the joint member so that a groove is formed between the axial engagement surface of the slidable shaft and the end face of the joint member, and the engagement section of the stopper member is fitted in the groove so that the stopper member is prevented from at least an axial movement.

The other objects and features of this invention will become understood from the following description with reference to the accompanying drawings.

BRIEF DESCRIPTION OF THE DRAWINGS

In the drawings, like reference numerals designate like parts and elements throughout all figures, in which.

DETAILED DESCRIPTION OF THE INVENTION

Figure 1:
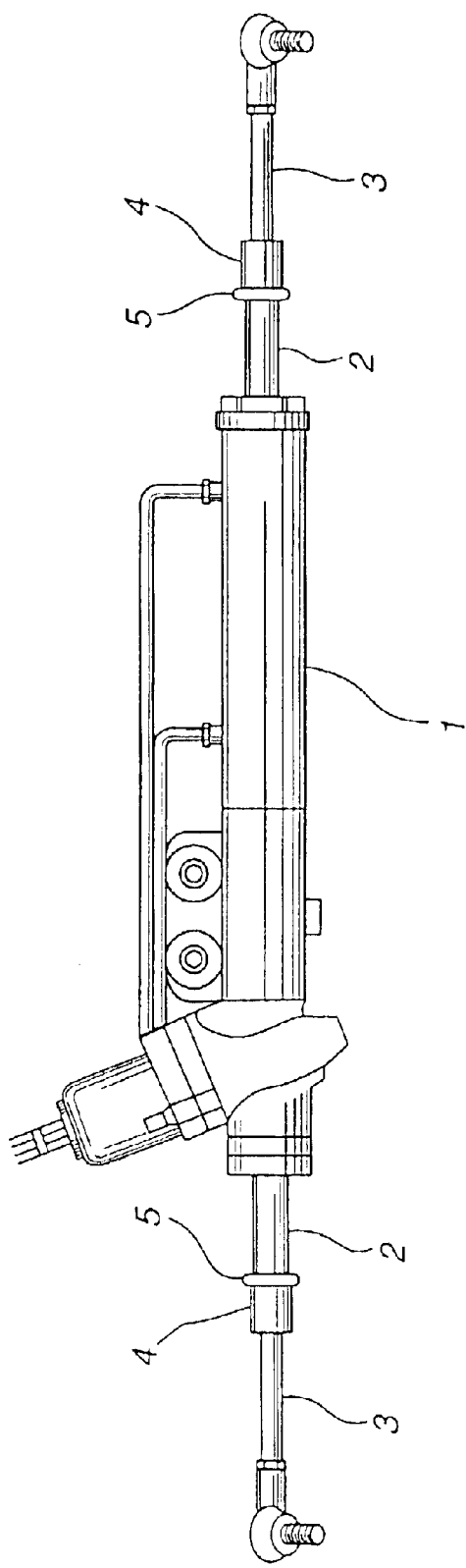
FIG. 1 is a front view of a power cylinder of a power steering system, constituting a first embodiment of a cylinder device according to the present invention.

Referring now to FIGS. 1 to 9, more specifically to FIG. 1, a power cylinder (cylinder device) of a power steering system is illustrated. The power cylinder comprises a cylinder (housing) 1 inside which a rack bar or slidable shaft 2 is axially slidably movably disposed. Rack bar 2 has opposite end sections which are extendable out of cylinder 1 and connected respectively to tie rods 3, 3 through sockets (joint members) 4, 4 and stopper members 5, 5. Each tie rod 3 is to be connected to a road wheel (not shown).

Figure 2:
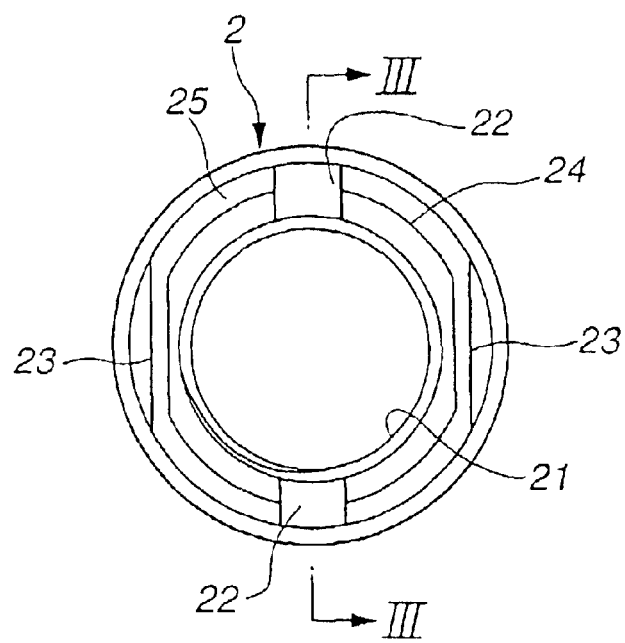
FIG. 2 is an enlarged end view of a rack bar of the power cylinder of FIG. 1.
Figure 3:
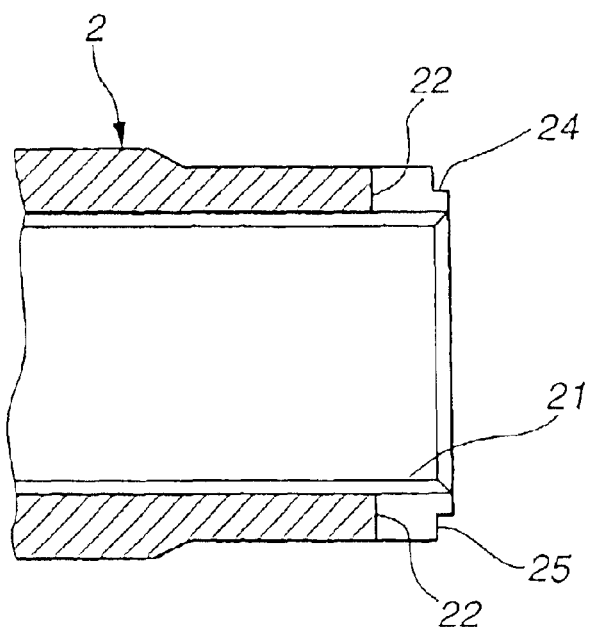
FIG. 3 is a fragmentary sectional view taken in the direction of arrows substantially along the line III—III of FIG. 2.

Each of the opposite end sections of rack bar 2 is formed cylindrical and formed at its inner peripheral surface with an internal thread 21 as shown in FIGS. 2 and 3. A tip end portion of each end section of rack bar 2 is formed with two cutouts (axial engagement sections) 22, 22 which are located diametrically opposite to each other. Two cutouts 22, 22 extend along a first diametrically extending plane (not shown) in the end section of the rack bar 2, so that each cutout 22 diametrically extends from the inner peripheral surface to the outer peripheral surface of the tip end portion of the end section of the rack bar 2, and axially extends to the end face of rack bar 2. Additionally, the tip end portion of each end section of the rack bar 2 is formed with two long flat surfaces 23, 23 extends parallel with the first diametrically extending plane in the end section of rack bar 2. Two long flat surfaces 23, 23 are located on the opposite sides of the first diametrical extending plane. Each of two long flat surfaces 23, 23 extends perpendicular to a second diametrically extending plane perpendicular to the first diametrically extending plane, and have two sections (not identified) which extend from the second diametrically extending plane by equal distances. Each flat surface axially extends to the end face of the rack bar 2.

Further, an extreme end portion (including the end face of rack bar 2) of each end section of rack bar 2 is annularly cutout to form an annular cutout (no numeral) which radially outwardly extends to the outer peripheral surface of the end section of rack bar 2 and axially extends to the end face of rack bar 2, thereby forming a small-diametrical cylindrical surface 24 and an annular flat surface (axial engagement section or surface) 25. The annular flat surface 25 is exposed at a tip end of rack bar 2 which tip end includes the end face of rack bar 2 and forms part of the extreme end portion. Small-diametrical cylindrical surface 24 is an outer peripheral surface of a small-diameter section of rack bar 2. Cylindrical surface 24 is coaxial with the end section of rack bar 2 and axially extends to the end face of rack bar 2. Annular flat surface 25 is coaxial with the end section of the rack bar 2 and radially outwardly extends to the outer peripheral surface the end section of rack bar 2.

Figure 4:
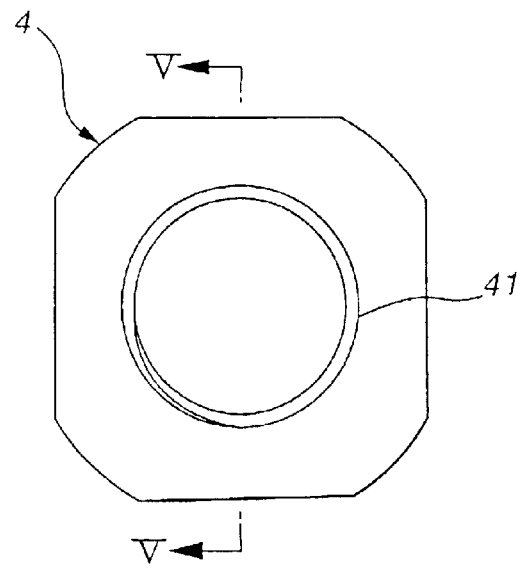
FIG. 4 is an enlarged end view of a socket of the power cylinder of FIG. 1.
Figure 5:
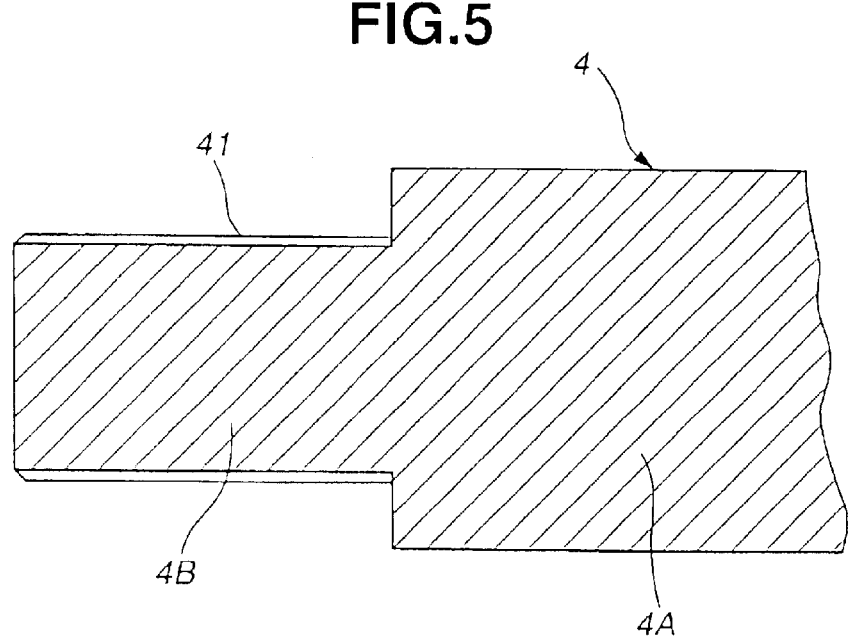
FIG. 5 is a fragmentary sectional view taken in the direction of arrows substantially along the line V—V of FIG. 4.

As shown in FIGS. 4 and 5, each of sockets 4, 4 is bendably connected at its one end with the tie rod 3 through a spherical or ball joint. Socket 4 forms a large diameter section 4A of a one-piece body (no numeral). A shaft section 4B forming a small diameter section of the one-piece body formed at and axially extends from the end face of the socket 4 so as to be coaxial with the socket 4. The shaft section 4B is formed at its outer peripheral surface with an external thread 41 which is to be engaged with the internal thread 21 of each end section of rack bar 2 so that socket 4 is connected to rack bar 2 in a condition where the end face of socket 4 is in contact with the end face of rack bar 2.

Figure 6:
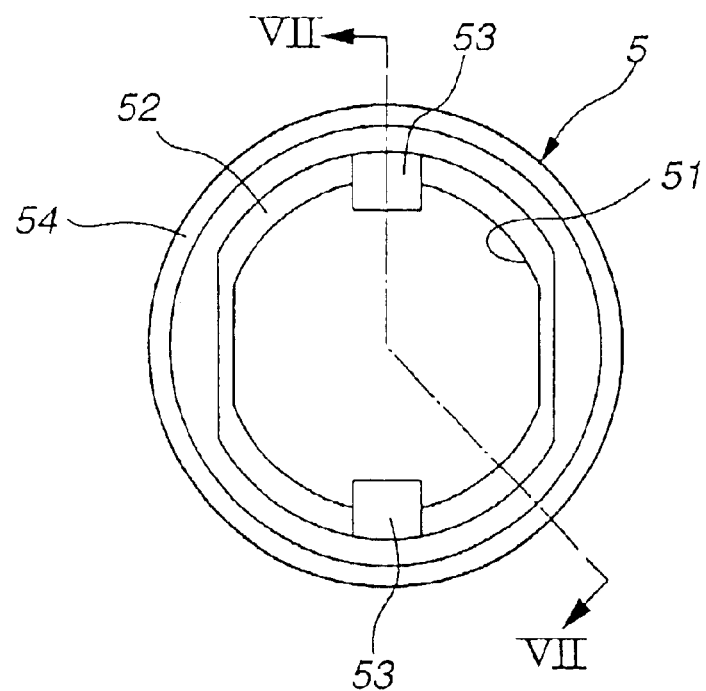
FIG. 6 is an enlarged front view of a stopper member of the power cylinder of FIG. 1.
Figure 7:
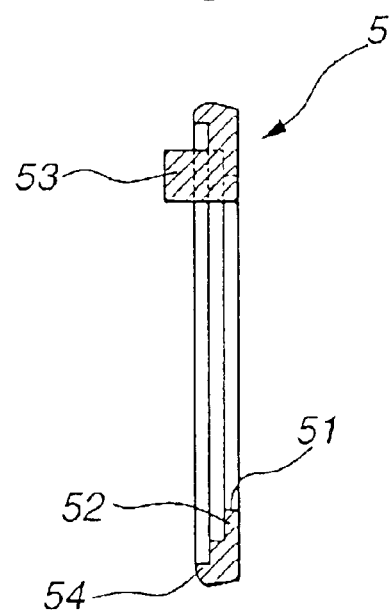
FIG. 7 is a sectional view taken in the direction of arrows substantially along the line VII—VII of FIG. 6.
Figure 8:
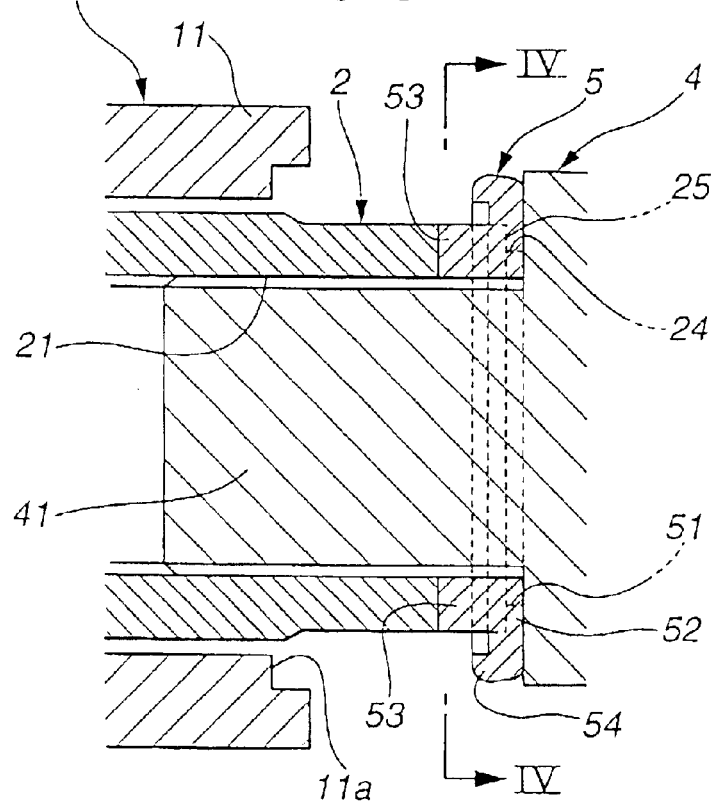
FIG. 8 is an enlarged fragmentary section view showing an essential part of the power cylinder of FIG. 1.

As seen in FIG. 8, each stopper member 5 is disposed at the joint between rack bar 2 and socket 4 in order to stop a relative sliding movement between cylinder 1 and rack bar 2 upon coming into contact with an end cover 11 provided to the end section of cylinder 1 or with cylinder 1 itself and to exhibit a buffering or shock-absorbing function when socket 4 strikes against cylinder 1. As shown in FIGS. 6 and 7, stopper member 5 is formed generally annular to form an opening 51 through which stopper member 5 is mounted on the outer peripheral surface of the tip end portion of the end section of rack bar 2 which tip end portion is formed with two long parallel surfaces 23, 23. A generally annular engagement section 52 extends radially inwardly from the inner peripheral surface of stopper member 5 defining opening 51 and located on the side of socket 4. Annular engagement section 52 is loosely disposed around small-diametrical cylindrical surface 24 of the extreme end portion of rack bar 2 and loosely fitted between annular flat surface 25 of the extreme end portion of rack bar 2 and socket 4. It will be understood that an annular groove is formed by small-diametrical cylindrical surface 24, annular flat surface 25 and the end face of main body section 4A of socket 4, in which the stopper member 5 can be prevented from its axial movement in a condition where annular engagement section 52 is loosely fitted in the annular groove.

Additionally, engagement projections 53, 53 are formed projecting from the inner peripheral surface (defining opening 51) of stopper member 5 and project radially inwardly and axially toward rack bar 2. Engagement projections 53, 53 are to be respectively loosely fitted in cutouts 22, 22 of rack bar 2. An annular projection 54 is formed at the outer peripheral section of stopper member 5 and axially projects toward cylinder 1. This annular projection 54 is to be brought into contact with end cover 11 or cylinder 1. Annular projection 54 is formed of an elastomeric material such as polyurethane resin or the like, and formed as a one-piece structure. Each stopper member 5 is formed with two long flat surfaces (no numerals) which are parallel with each other and face to each other, and correspond respectively to the two long flat surfaces 23, 23 of rack bar 2. The two long flat surfaces of stopper member 5 are to be in contact with two long flat surfaces 23, 23 of rack bar 2.

Hereinafter, production and effects of the above-arranged power cylinder will be discussed.

The above power cylinder is assembled as follows: First, engagement projections 53, 53 of stopper member 5 are respectively loosely fitted into cutouts 22, 22 of the end section of rack bar 2 while annular engagement section 52 of stopper member 56 is mounted around cylindrical surface 24 of the small-diameter section of rack bar 2, thereby accomplishing assembly of stopper member 5 to the end section of rack bar 2. Thereafter, external thread 41 of shaft section 4B of socket 4 is engaged with the internal thread 21 of the end section of rack bar 2 so as to establish a condition where the end face of socket 4 is brought into contact with the end face of rack bar 2 through stopper member 5. This assembly operation is carried out for each of the opposite end sections of rack bar 2. Thus, the assembly operation for the power cylinder is completed.

Figure 9:
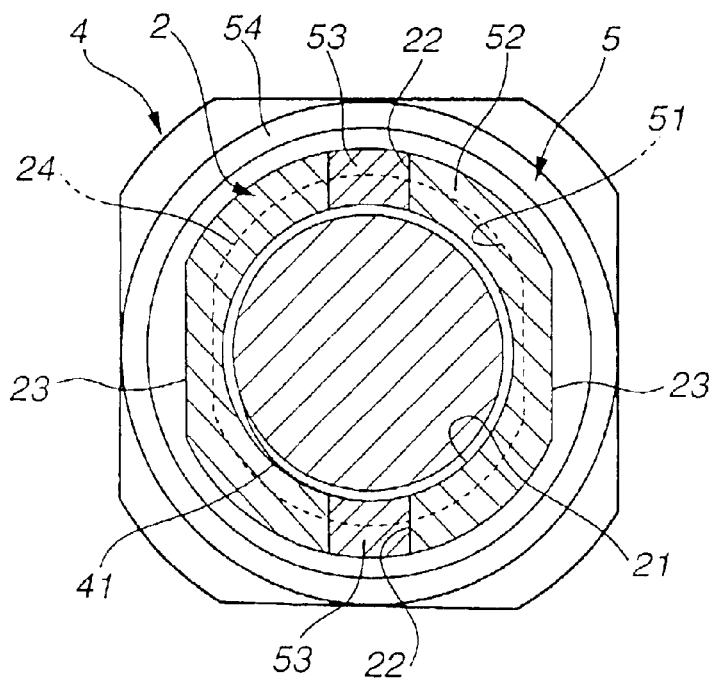
FIG. 9 is a sectional view taken in the direction of arrows substantially along the line of IX—IX of FIG. 8.

In the assembled condition of the power cylinder, as shown in FIGS. 8 and 9, annular engagement section 52 of stopper member 5 is put in a loose fit condition between annular flat surface 25 of rack bar 2 and the end face of socket 4 so that stopper member 5 can be prevented from its axial movement. Annular flat surface 25 faces the end face of socket 4. Furthermore, engagement projections 53, 53 of stopper member 5 are respectively loosely fitted into cutouts 22, 22 so that stopper member 5 is prevented from its rotation, while tip end faces of engagement projections 53, 53 are brought into axial contact with the axial end faces of cutouts 22, 22 upon stopper member 5 being in contact with the end face of socket 4 so that stopper member 5 is prevented from its axial movement.

Furthermore, the end face of stopper member on the side of socket 4 is in contact with and supported by the end face of socket 4, and therefore an axial load produced when annular projection 54 of stopper member 5 is brought into contact with stopper section 11a of end cover 11 or the cylinder 1 is received through stopper member 5 by the end face of socket 4.

In the power cylinder of this embodiment, as discussed above, the end face of rack bar 2 is reduced in surface area under formation of annular cutout (for stopper member 5) defined by cylindrical surface 24 and annular flat surface 25. This area-reduced end face of rack bar 2 and the end face of socket 4 are brought into contact with each other, in which rack bar 2 and socket 4 are put into a connected state. Accordingly, installation of stopper member 5 can be made without changing the axial length of a connected body of rack bar 2 and socket 4. As a result, the power cylinder can be prevented from becoming large-sized while effectively exhibiting the buffer function. Additionally, the power cylinder can avoid receiving restriction in design for its axial length.

Engagement projections 53, 53 of stopper member 5 are respectively loosely fitted into cutouts 22, 22 so that stopper member 5 is prevented from its rotation. Simultaneously, engagement projections 53, 53 are brought into axial contact with the axial end faces of cutouts 22, 22 upon stopper member 5 being in contact with the end face of socket 4 so that stopper member 5 is prevented from its axial movement. Additionally, annular engagement section 52 of stopper member 5 is fitted between annular flat surface 25 of rack bar 2 and the end face of socket 4 so that stopper member 5 is prevented from its axial movement. As a result, the assembled state of the power cylinder can be securely maintained.

Furthermore, the end face of stopper member 5 on the side of socket 4 is in contact with and supported by the end face of socket 4, and therefore it is unnecessary to use any support member (formed of a high stiffness material such as metal) for stopper member 5 in order that only stopper member 5 endures the axial load generated upon contacting of stopper member 5 to the cylinder 1. Thus, it becomes possible that stopper member 5 is formed of only the elastomeric material, which reduces the number of parts of the power cylinder thereby achieving a cost reduction for the power cylinder.

The power cylinder is arranged such that engagement projections 53, 53 of stopper member 5 are respectively loosely fitted into cutouts 22, 22, while annular engagement section 52 of stopper member 5 is loosely fitted between annular flat surface 25 of rack bar 2 and the end face of socket 4 in such a manner that the annular engagement section is axially restrained in a loose fit condition. As a result, the elastomeric material forming stopper member 5 can be prevented from receiving stress thereby avoiding its early aging or deterioration.

Figure 10:
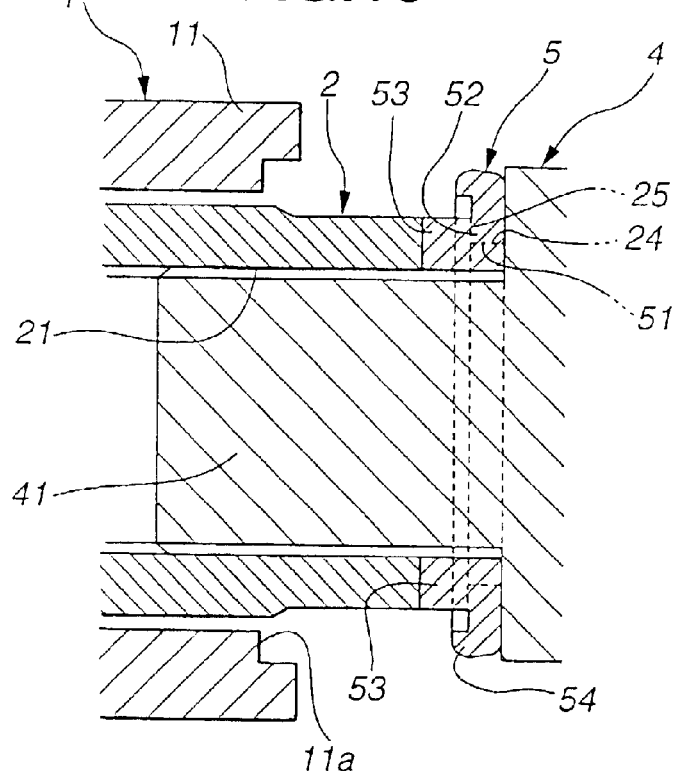
FIG. 10 is a sectional view similar to FIG. 8 but showing a second embodiment of the cylinder device according to the present invention.

FIG. 10 illustrates a second embodiment of the power cylinder according to the present invention, which is similar to the first embodiment power cylinder with the following exception: The width or axial dimension of the small-diametrical cylindrical surface 24 of rack bar 2 is generally the same as the thickness of the main body section (except for annular projection 54) of stopper member 5. Annular engagement section 52 of stopper member 5 has the same thickness as that of the main body section of stopper member 5.

Accordingly, with the second embodiment power cylinder, in addition to be able to obtaining the same effects as in the first embodiment power cylinder, the thickness (axial dimension) of annular engagement section 52 is increased thereby improving the durability of stopper member 5.

Figure 11:
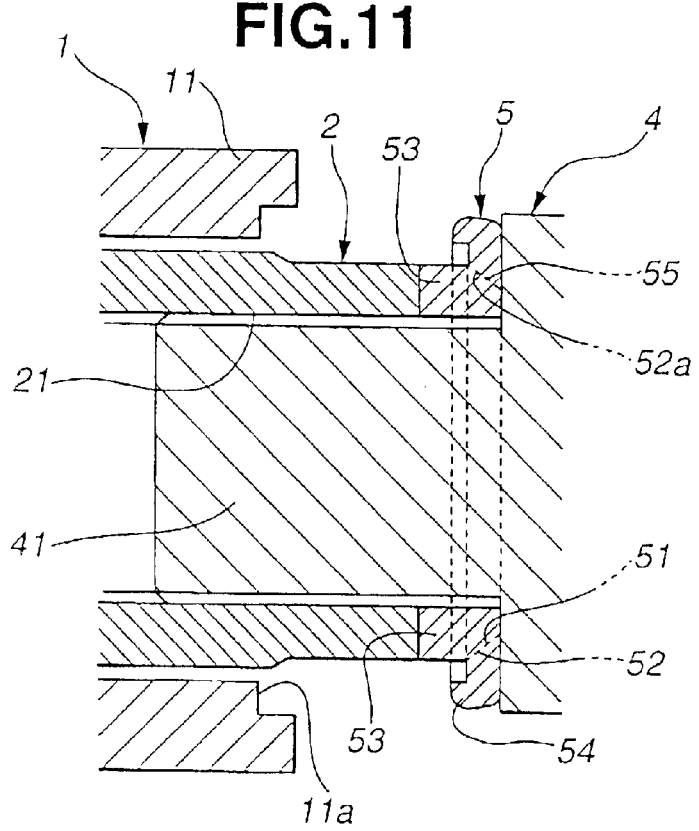
FIG. 11 is a sectional view similar to FIG. 8 but showing a third embodiment of the cylinder device according to the present invention.

FIG. 11 illustrates a third embodiment of the power cylinder according to the present invention, which is similar to the first embodiment power cylinder with the following exception: The extreme end portion (including the end face) of rack bar 2 is cutout in such a manner as to form an annular tapered or frustoconical surface 55 whose diameter decreases in a direction toward the end face of rack bar 2. Tapered surface 55 is exposed at the tip end (including the end face) of rack bar 2 and faces the end face of socket 4. Additionally, stopper member 5 is formed along its inner periphery with annular engagement section 52a which has a generally right-triangular cross-section. In other words, stopper member 5 has an annular inner peripheral surface (defining opening 51) which is tapered or frustoconical so that its diameter decreases in a direction toward socket 4. The annular inner peripheral surface of stopper member 5 is in tight contact with annular tapered surface 55 of rack bar 2 so that annular tapered surface 55 serves as the axial engagement section or surface for stopper member 5.

Accordingly, with the third embodiment power cylinder, in addition to be able to obtaining the same effects as in the first embodiment power cylinder, machining for the axial engagement section or surface in rack bar 2 is easily accomplished thereby making it possible to reduce the production cost of the power cylinder since the axial engagement section can be formed by cutting out the outer peripheral portion of the tip end portion of rack bar 2.

While the preferred embodiments of the invention have been described with reference to the drawings, it is to be understood that changes and variations may be made without departing from the spirit of scope of the present invention. For example, although the principle of the present invention has been shown and described as being applied to the power cylinder of the power steering system, it will be understood that it may be applicable to all cylinder devices arranged such that a shaft is slidably inserted in a housing.

Although stopper member 5 of the embodiments of the present invention has been shown and described as being provided with engagement projections 53, 53 which are respectively loosely fitted in cutouts 22, 22 and annular engagement section 52 which is loosely fitted between annular flat surface 25 of rack bar 2 and the end face of socket 4 in such a manner as to be axially restrained in a loose fit condition, it will be understood that it may be sufficient that either one of the engagement projections 53,

53 and the annular engagement section 52 is provided at least for the purpose of preventing stopper member 5 from its axial movement. In case of providing only engagement projections 53, 53, stopper member 5 may be prevented from its both axial and rotational movements.

As appreciated from the above, according to the present invention, the stopper member is installed in position in such a manner that its engagement section is fitted in the groove formed between the axially restraining surface of a slidable shaft (rack bar) and the end face of a joint member (socket), so that the shaft and the joint member are connected to each other in the condition where the end face of the shaft is in contact with an end face of the joint member which end face is smaller in surface area than the cross-sectional area of the end section of the slidable shaft. As a result, the stopper member having a buffering function can be installed without changing the axial length of a cylinder device (power cylinder), thereby preventing the cylinder device from being large-sized without receiving restriction relating to its axial length in design.

The entire contents of Japanese Patent Application No. 2002-144781, filed May 20, 2002, are incorporated herein by reference.

What is claimed is:

1. A cylinder device comprising:

a housing;

a slidable shaft which is slidably movably disposed inside the housing and projectable out of the housing;

a joint member connected to the end section of the slidable shaft; and a stopper member disposed at a joint section between the slidable shaft and the joint member so as to be brought into contact with an end section of the housing to stop a relative slidable movement between the slidable shaft and the housing and to provide a buffering function during contact of the slidable shaft to the housing;

wherein the end section of the slidable shaft is partially cutout to form an axial engagement surface exposed at a tip end of the slidable shaft including an end face whose surface area is smaller than a cross-sectional area of the end section;

the slidable shaft and the joint member are connected to each other in a condition where the end face of the slidable shaft is in contact with an end face of the joint member so that a groove is formed between the axial engagement surface of the slidable shaft and the end face of the joint member; and the stopper member is formed annular to have an opening so as to be mountable on an outer peripheral surface of the slidable shaft and has an engagement section formed along an inner periphery of the stopper member, the engagement section of the stopper member being fitted in the groove so that the stopper member is prevented from at least an axial movement.

2. A cylinder device as claimed in claim 1, wherein the stopper member is formed of only an elastomeric material and in contact with the end face of the joint member so as to be supported by the joint member.

3. A cylinder device as claimed in claim 1, wherein an axial distance of the axial engagement surface from the end face of the end section of the slidable shaft is substantially equal to a thickness of a main body section of the stopper, wherein the engagement section of the stopper member is generally annular and has a thickness substantially equal to the thickness of the main body section, the annular engagement section radially inwardly protruding from the main body section.

4. A cylinder device as claimed in claim 1, wherein 1, wherein an outer peripheral portion of the end section of the slidable shaft is obliquely cutout to form an annular tapered surface, wherein the engagement section of the stopper member is generally annular and formed along its inner periphery with a tapered surface in contact with the tapered surface of the end section of the slidable shaft.

5. A cylinder device as claimed in claim 1, wherein the engagement section of the stopper member is generally annular and has first two parallel flat surfaces located at an inner periphery of the annular engagement section, and second two parallel flat surfaces located at an inner peripheral surface which is adjacent to the annular engagement section and in contact with the outer peripheral surface of the slidable shaft.

6. A cylinder device as claimed in claim 1, wherein the cylinder device is a power cylinder of a power steering system.

7. A method of assembling a cylinder device including a housing, a slidable shaft which is slidably movably disposed inside the housing and projectable out of the housing, a joint member connected to the end section of the slidable shaft, and a stopper member disposed at a joint section between the slidable shaft and the joint member so as to be brought into contact with an end section of the housing to stop a relative slidable movement between the slidable shaft and the housing and to provide a buffering function during contact of the slidable shaft to the housing, the assembling method comprising the following steps of:

providing the slidable shaft whose end section is partially cutout to form an axial engagement surface exposed at a tip end of the slidable shaft including an end face whose surface area is smaller than a cross-sectional area of the end section;

providing the stopper member formed annular to have an opening so as to be mountable on an outer peripheral surface of the slidable shaft and having an engagement section formed along an inner periphery of the stopper member; and connecting the slidable shaft and the joint member to each other in a condition where the end face of the slidable shaft is in contact with an end face of the joint member so that a groove is formed between the axial engagement surface of the slidable shaft and the end face of the joint member, and the engagement section of the stopper member is fitted in the groove so that the stopper member is prevented from at least an axial movement.

8. A method as claimed in claim 7, wherein stopper member providing step includes forming the stopper member of only an elastomeric material to be in contact with the end face of the joint member so as to be supported by the joint member.

9. A method as claimed in claim 7, wherein the stopper member providing step includes forming the stopper member such that a thickness of a main body section of the stopper is substantially equal to an axial distance of the axial engagement surface from the end face of the end section of the slidable shaft, and such that the engagement section of the stopper member is generally annular and has a thickness substantially equal to the thickness of the main body section, the annular engagement section radially inwardly protruding from the main body section.

10. A method as claimed in claim 7, wherein the slidable shaft providing step includes obliquely cutting out an outer peripheral portion of the end section of the slidable shaft to form an annular tapered surface, wherein the stopper member providing step includes forming the stopper member such that the engagement section of the stopper member is generally annular and formed along its inner periphery with a tapered surface in contact with the tapered surface of the end section of the slidable shaft.

11. A method as claimed in claim 7, wherein the stopper member providing step includes forming the stopper member such that the engagement section of the stopper member is generally annular and has first two parallel flat surfaces located at an inner periphery of the annular engagement section, and second two parallel flat surfaces located at an inner peripheral surface which is adjacent to the annular engagement section and in contact with the outer peripheral surface of the slidable shaft.

12. A method as claimed in claim 7, wherein the cylinder device is a power cylinder of a power steering system.

* * * * *